(12) United States Patent
Pino

(10) Patent No.: US 12,186,984 B2
(45) Date of Patent: Jan. 7, 2025

(54) THREE-DIMENSIONAL PRINTER ENCLOSURE

(71) Applicant: Honeywell Federal Manufacturing & Technologies, LLC, Kansas City, MO (US)

(72) Inventor: Ruben Arturo Pino, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 196 days.

(21) Appl. No.: 17/860,205

(22) Filed: Jul. 8, 2022

(65) Prior Publication Data

US 2023/0068289 A1    Mar. 2, 2023

Related U.S. Application Data

(60) Provisional application No. 63/239,432, filed on Sep. 1, 2021.

(51) Int. Cl.
 *B29C 64/25* (2017.01)
 *B33Y 30/00* (2015.01)

(52) U.S. Cl.
 CPC ............. *B29C 64/25* (2017.08); *B33Y 30/00* (2014.12)

(58) Field of Classification Search
 CPC ..... B29C 64/25; B29C 64/371; B29C 64/364; B33Y 30/00
 See application file for complete search history.

(56) References Cited

U.S. PATENT DOCUMENTS

| | | |
|---|---|---|
| D242,872 S | 12/1976 | Wheeler |
| D717,850 S | 11/2014 | Kawai |
| D732,586 S | 6/2015 | Chen et al. |
| D732,587 S | 6/2015 | Hsu et al. |
| D738,410 S | 9/2015 | Liu et al. |
| D749,155 S | 2/2016 | Kemperle et al. |
| 9,358,728 B1 | 6/2016 | Chang et al. |
| D770,545 S | 11/2016 | Olivéet al. |
| D777,228 S | 1/2017 | Chang et al. |
| D777,808 S | 1/2017 | Chang et al. |
| D787,574 S | 5/2017 | Lee et al. |
| D808,453 S | 1/2018 | Share et al. |
| D809,574 S | 2/2018 | Lin |
| D810,156 S | 2/2018 | Lin |
| D826,296 S | 8/2018 | Noorazar et al. |

(Continued)

OTHER PUBLICATIONS

Non-final Office Action mailed Oct. 13, 2023 in related U.S. Appl. No. 29/821,387, 9 pages.

(Continued)

*Primary Examiner* — Galen H Hauth
*Assistant Examiner* — Baileigh Kate Darnell
(74) *Attorney, Agent, or Firm* — Hovey Williams LLP

(57) ABSTRACT

An enclosure for a three-dimensional printing system comprises a plurality of walls and a glass panel. The walls define an inner chamber for receiving the three-dimensional printing system and an opening that provides access to the inner chamber from outside the walls. The glass panel is shiftable between a closed position in which the panel blocks access to the inner chamber and an open position in which the panel allows access to the inner chamber via the opening.

20 Claims, 12 Drawing Sheets

(56) References Cited

U.S. PATENT DOCUMENTS

| | | |
|---|---|---|
| D841,702 S | 2/2019 | Moroni |
| D854,591 S | 7/2019 | Gupta et al. |
| D865,009 S | 10/2019 | Kobayashi |
| D871,463 S | 12/2019 | Cao et al. |
| D873,314 S | 1/2020 | Gauthier et al. |
| D887,461 S | 6/2020 | Malmén |
| D892,875 S | 8/2020 | Medalsy et al. |
| D893,567 S | 8/2020 | Cumming et al. |
| D895,698 S | 9/2020 | Palmer et al. |
| D903,730 S | 12/2020 | Johnson |
| D905,134 S | 12/2020 | Chen |
| D905,139 S | 12/2020 | Ferraro et al. |
| D907,077 S | 1/2021 | Gjovik et al. |
| D922,456 S | 6/2021 | Schmitt et al. |
| D927,565 S | 8/2021 | Yao |
| D927,566 S | 8/2021 | Yao |
| D934,926 S | 11/2021 | Hong et al. |
| D934,927 S | 11/2021 | Hong et al. |
| D938,502 S | 12/2021 | Yang et al. |
| D955,449 S | 6/2022 | Schmitt et al. |
| D958,236 S | 7/2022 | Wu et al. |
| D978,931 S | 2/2023 | Reches et al. |
| D979,615 S | 2/2023 | Reches et al. |
| D981,456 S | 3/2023 | Reichental et al. |
| D985,026 S | 5/2023 | Li et al. |
| D990,538 S | 6/2023 | Wu et al. |
| 11,760,001 B2 | 9/2023 | Swanson et al. |
| 2010/0182674 A1* | 7/2010 | Nichols ................. G02F 1/0121 359/275 |
| 2015/0110911 A1* | 4/2015 | Snyder ................. B29C 64/321 95/12 |
| 2016/0082670 A1 | 3/2016 | Paroda et al. |
| 2017/0087682 A1* | 3/2017 | Leonhard ................. F16M 1/00 |
| 2017/0151704 A1* | 6/2017 | Go ....................... B29C 48/266 |
| 2017/0313049 A1* | 11/2017 | Colchester ............ B29C 64/245 |
| 2021/0402689 A1 | 12/2021 | Niederberger |
| 2022/0001613 A1* | 1/2022 | Chapman .............. B29C 64/232 |
| 2022/0314542 A1 | 10/2022 | Neal et al. |
| 2023/0068289 A1 | 3/2023 | Pino |

OTHER PUBLICATIONS

Non-final Office Action mailed Oct. 13, 2023 in related U.S. Appl. No. 29/901,046, 7 pages.

Ile Kauppila, "Additive Metallurgy—The Best #D Printers of 2023", (published Sep. 7, 2023), ALL3DP.com website, URL: <https://all3dp.com/1/3d-metal-3d-printer-metal-3d-printing/> (Year: 2023).

Non-final Office Action mailed Jun. 28, 2023 in related U.S. Appl. No. 29/821,387, 10 pages.

* cited by examiner

THREE-DIMENSIONAL PRINTER ENCLOSURE

RELATED APPLICATIONS

The present application is a non-provisional application and claims priority of U.S. Provisional Patent Application Ser. No. 63/239,432 filed on Sep. 1, 2021, and entitled "THREE-DIMENSIONAL PRINTER ENCLOSURE," which is hereby incorporated in its entirety by reference herein.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Three-dimensional printer performance is sensitive to an environment in which the printer is operating. External interferences can strongly affect the quality of a print. The external interferences may include dust or accidental human intervention, such as bumping a build stage of the printer. Some three-dimensional printers rely on cameras to capture data while operating, and changes to ambient light, such as a person's shadow or an external light, can affect the quality of the data. Bad prints are costly because of the energy, time, and materials required to print an article. Further, some prints involve confidential articles that should only be seen by select users, so open-environment printing poses security risks.

The background discussion is intended to provide information related to the present invention which is not necessarily prior art.

SUMMARY OF THE INVENTION

The present invention solves the above-described problems and other problems by providing an enclosure that enables control of environmental conditions and security of a three-dimensional printer.

An enclosure constructed according to an embodiment of the present invention is configured to enclose a three-dimensional printing system. The enclosure comprises a plurality of walls and a glass panel. The walls define an inner chamber for receiving the three-dimensional printing system and an opening that provides access to the inner chamber from outside the walls. The glass panel is shiftable between a closed position in which the panel blocks access to the inner chamber and an open position in which the panel allows access to the inner chamber via the opening.

A method of enclosing of a three-dimensional printer according to an embodiment of the present invention broadly comprises positioning an enclosure adjacent to the three-dimensional printer. The enclosure comprises a plurality of walls and a glass panel. The walls define an inner chamber for receiving the three-dimensional printer and an opening providing access to the inner chamber from outside the plurality of walls. The glass panel is shiftable between a closed position in which the panel blocks access to the inner chamber and an open position in which the panel allows access to the inner chamber via the opening. The method further comprises moving the enclosure so that the inner chamber receives the three-dimensional printer.

An enclosure constructed according to another embodiment of the present invention broadly comprises a plurality of walls, a plurality of electrochromic glass panels, a switching mechanism, and a locking mechanism. The walls define an inner chamber for receiving a three-dimensional printing system and an opening providing access to the inner chamber from outside of the walls. The panels are shiftable between closed positions in which the panels block access to the inner chamber and open positions in which the panels allow access to the inner chamber via the opening. The panels comprise horizontally shiftable side panels and a vertically shiftable front panel. The switching mechanism is configured to activate the side panels and the front panel so that they are transparent. The locking mechanism is configured to secure the panels in the closed position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
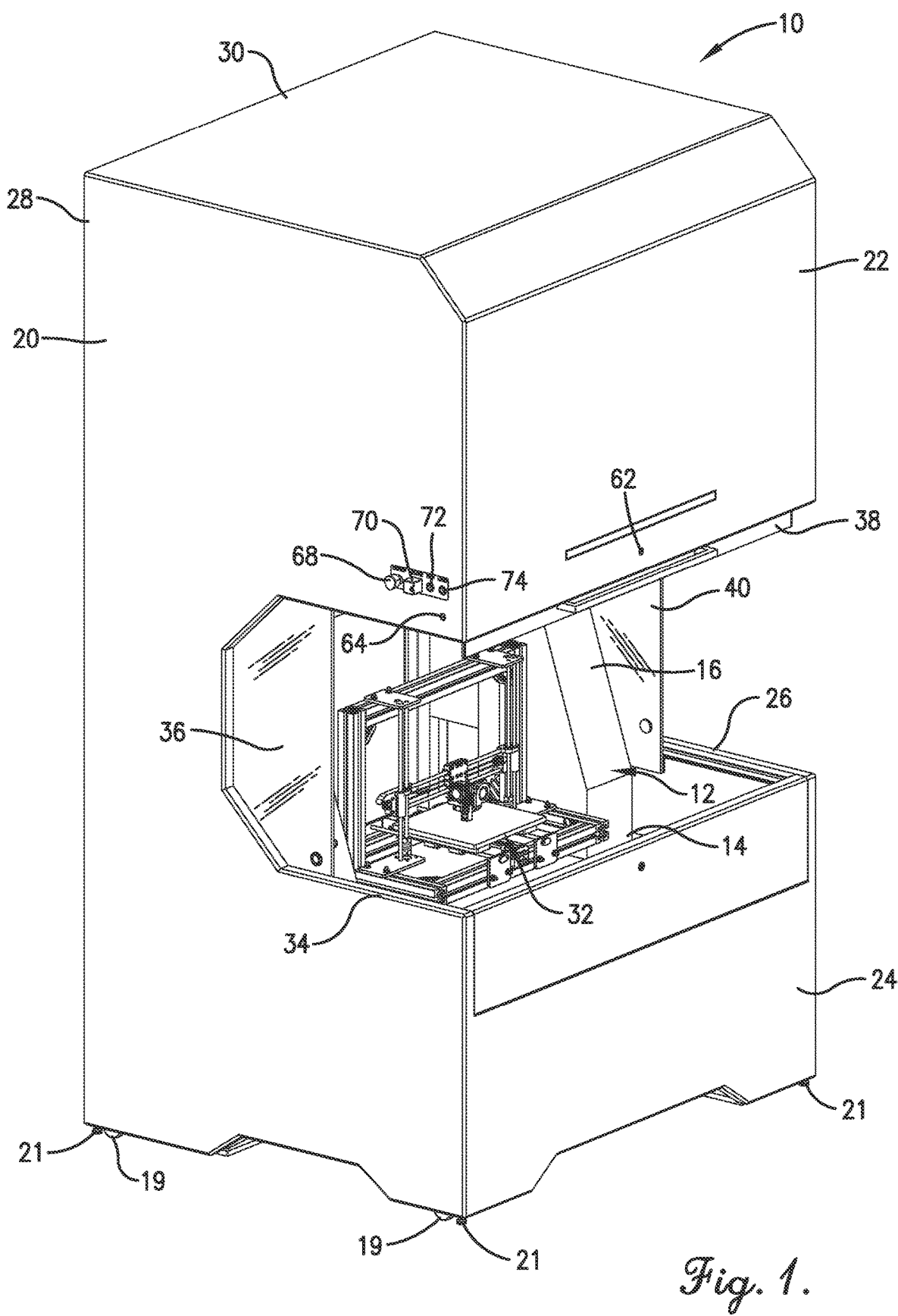
FIG. 1 is a perspective view of an enclosure constructed in accordance with embodiments of the present invention enclosing a three-dimensional printer.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an enclosure 10 constructed in accordance with an embodiment of the invention is illustrated. The illustrated enclosure 10 surrounds a three-dimensional printer 12, which can be any other type of additive manufacturing system without departing from the scope of the present invention. In some embodiments, the three-dimensional printer 12 is a three-axis printer. In some embodiments, the three-dimensional printer 12 is a five-axis printer. The three-dimensional printer 12 may include a build stage 14 and a gantry 16.

Figure 2:
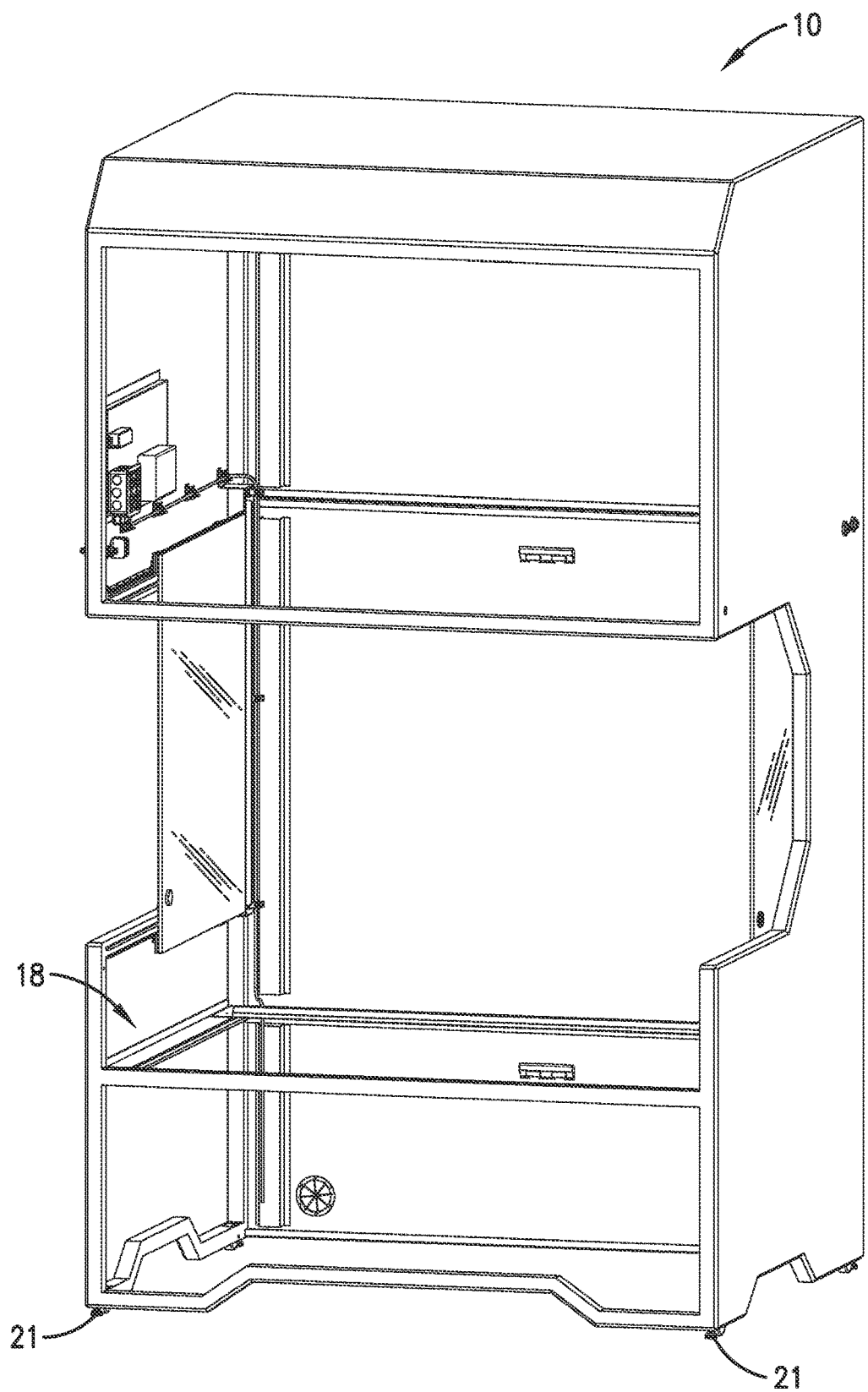
FIG. 2 is a perspective view of the enclosure of FIG. 1 with its front walls removed to show a frame.

The enclosure 10 comprises a frame 18 (depicted in FIG. 2), a plurality of walls 20, 22, 24, 26, 28, 30 attached to the frame 18 and defining an inner chamber 32 and an opening 34 providing access to the inner chamber 32, and a plurality of glass panels 36, 38, 40 operable to close the opening 34. A plurality of wheels 19 may be attached to the frame to enable the enclosure 10 to be mobile. A plurality of adjustable legs 21 may also be attached to the frame so that the enclosure 10 can be set upright. The frame 18 (depicted in FIG. 2) may comprise extruded aluminum, and the walls 20, 22, 24, 26, 28, 30 may comprise aluminum and be attached to the frame 18 via adhesive.

Figure 3:
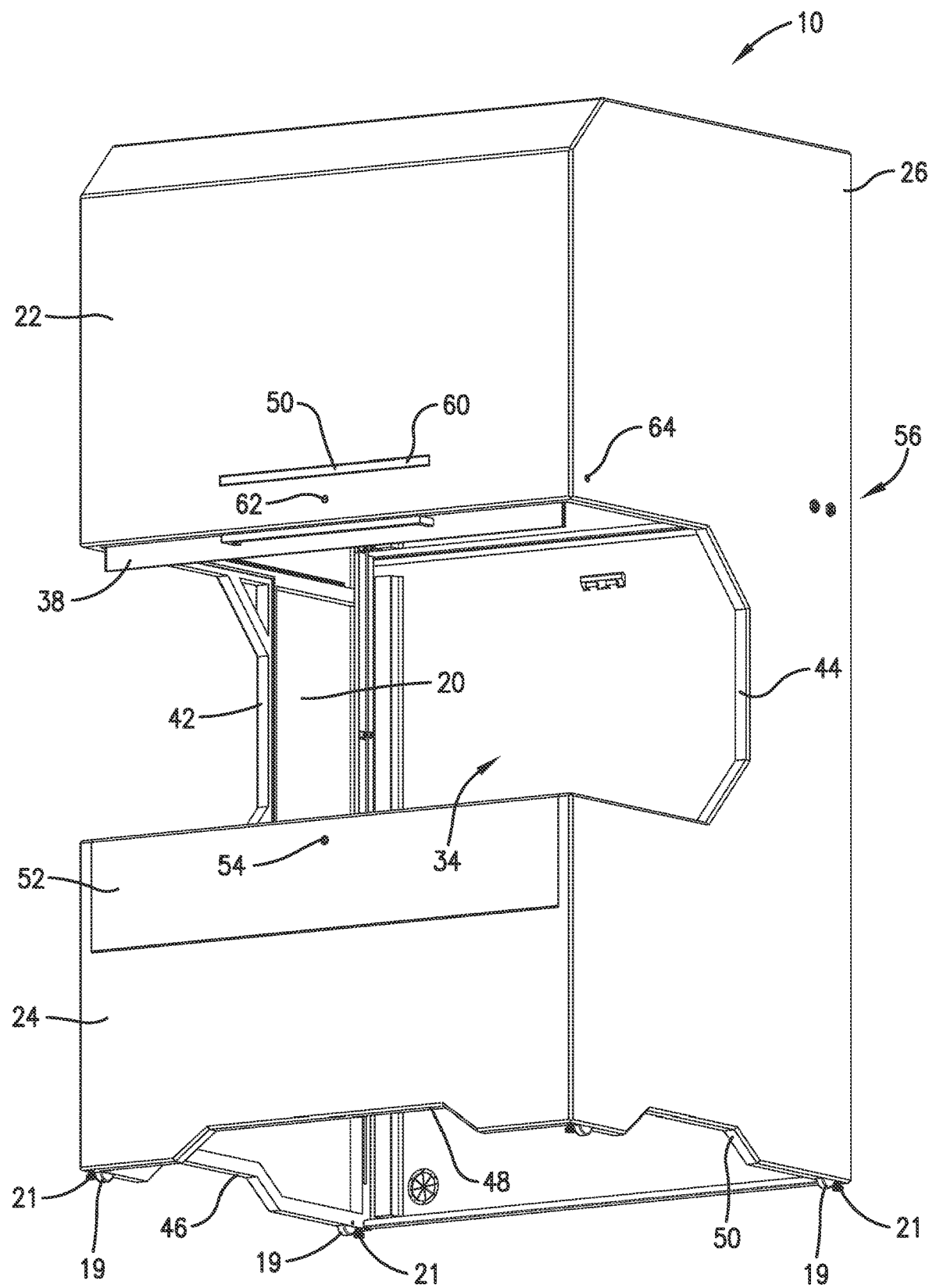
FIG. 3 is a lowered view of the enclosure of FIG. 1 with some of its glass panels removed.

Turning to FIG. 3, the side walls 20, 26 include notches 42, 44 for forming portions of the opening 34. Front walls 22, 24 may be spaced apart and attached on either ends of the notches 42, 44 to form the remaining portion of the opening 34. The front wall 24 and side walls 20, 26 may include pallet jack slots 46, 48, 50 configured to receive pallet forks for positioning the enclosure 10. Front wall 24 may further include a pivotally attached front tailgate 52 for providing extra access to the printer 12. The tailgate 52 may include a lock 54 for securing the tailgate 52 in place. One of the side walls 26 may include one or more nozzles 56 for receiving pressurized air from, for example, a pressurized air hose. The front wall 22 may include a recess 58 with a status light source 60, or indicator light, positioned therein. The status light source 60 may be configured to receive a signal representative of a status of the printer 12. The front wall 22 may also include a push lock 62 for securing the front glass panel 38 in a closed position. One of the side walls 26 may also include a push lock 64 configured to secure the side panel 40 (depicted in FIG. 1) in the closed position.

Turning back to FIG. 1, side wall 20 may likewise include a push lock 66 for securing panel 36 in the closed position. Side wall 20 may further include a switch 68 configured to send a signal to direct the printer 12 to stop operations, a switch 70 for activating the glass panels 36, 38, 40 (discussed in detail below), a switch 72 for turning on ionized air (discussed in detail below), and a switch 74 for turning on lights in the inner chamber 32.

Figure 4:
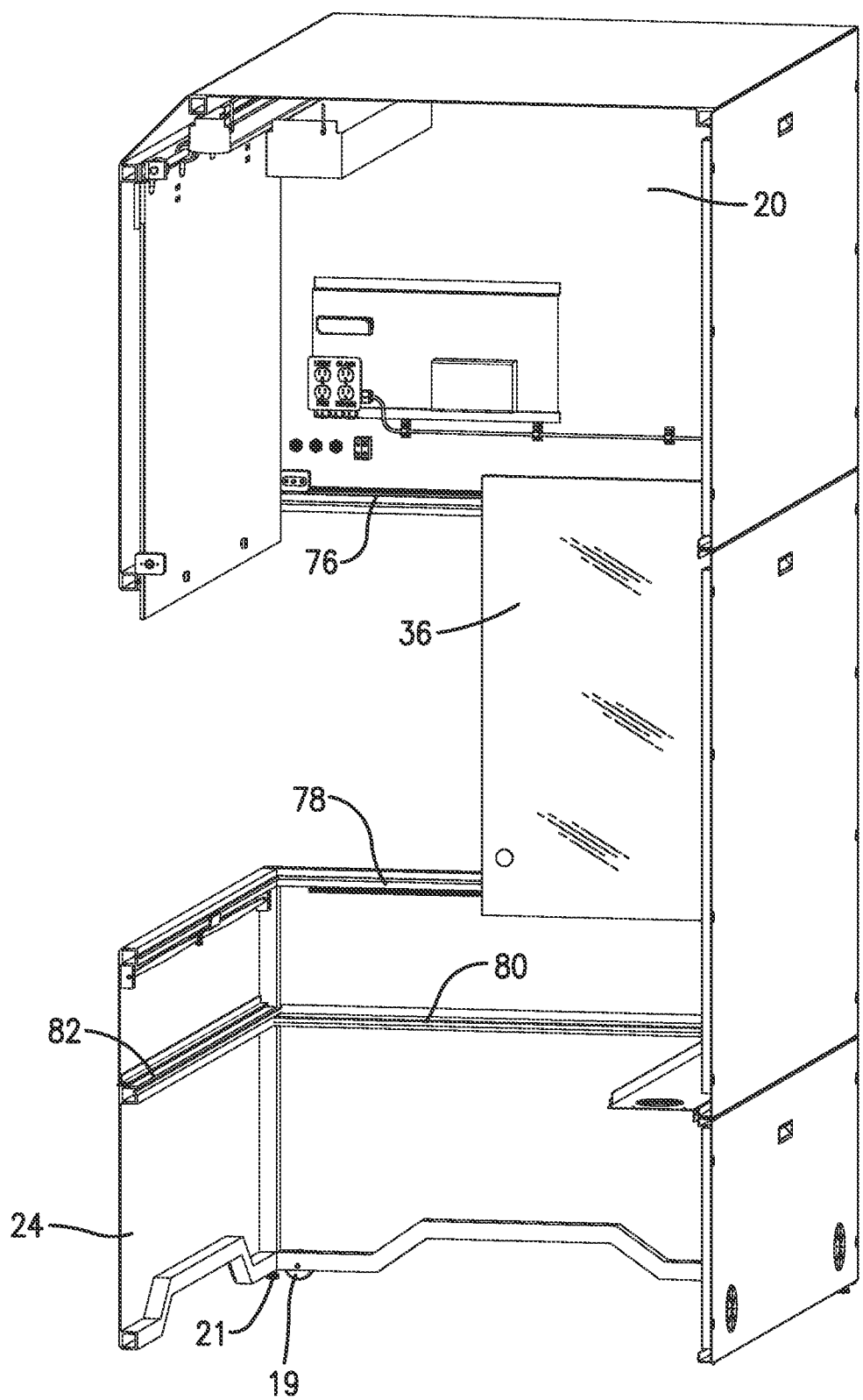
FIG. 4 is a first side view of the enclosure of FIG. 1 with one of its side walls removed to depict tracks.

Turning to FIG. 4, side wall 20 may further include tracks 76, 78 for supporting the side panel 36. The side wall 20 and front wall 24 may include thick seals 80, 82 configured to abut the stage platform 14 (depicted in FIG. 1). The seals 80, 82 may be at least 0.5 inches thick, and at least 1 inch thick in preferred embodiments. In some embodiments, the seals 80, 82 may comprise tubular gaskets/seals or foam seals. The seals 80, 82 help isolate the enclosure 10 from the printer 12 to avoid interferences affecting the printing operations of the printer 12, such as a person leaning against the enclosure 10, accidentally bumping the enclosure 10, or the like. The seals 80, 82 also make it so that the enclosure 10 does not have to be attached to the printer 12. The seals 80, 82 absorb forces on the enclosure 10 and also help at least partially seal the inner chamber 32 so that the inner chamber 32 has a positive pressure flow over the build stage 14.

Figure 5:
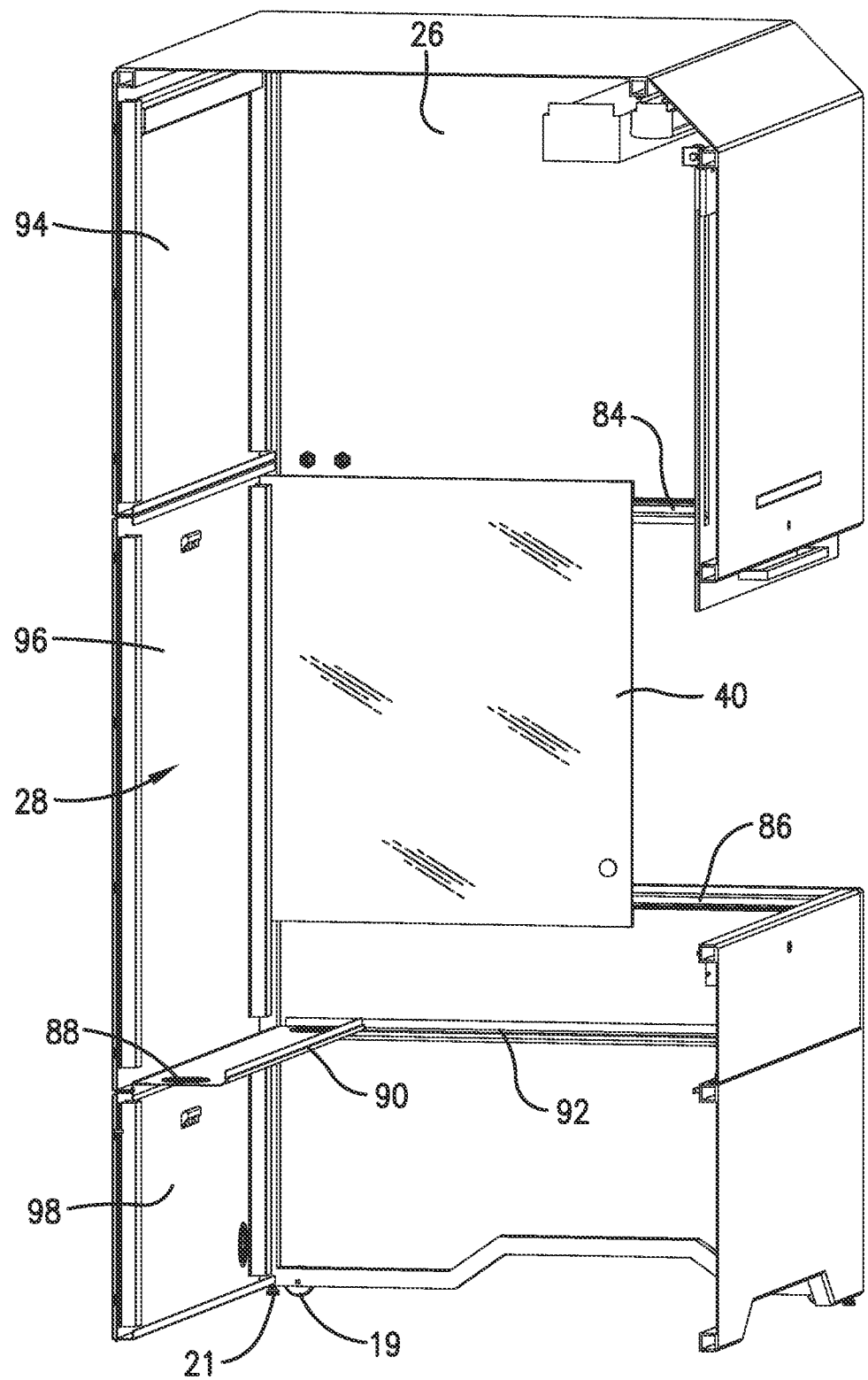
FIG. 5 is a second side view of the enclosure of FIG. 1 with one of its side walls removed to depict tracks.

Turning to FIG. 5, side wall 26 may further include tracks 84, 86 for supporting the side panel 40. The back wall 28 may include a connector plate 88 extending toward the printer 12 (depicted in FIG. 1). The connector plate 88 and side wall 26 may include thick seals 90, 92 configured to abut the stage platform 14 (depicted in FIG. 1). The seals 90, 92 may be at least 0.5 inches thick, and at least 1 inch thick in preferred embodiments. In some embodiments, the seals 90, 92 may comprise a tubular gasket/seal. The seals 90, 92 likewise help isolate the enclosure 10 from the printer 12 and also help at least partially seal the inner chamber 32 so that the inner chamber 32 has a positive pressure flow over the build stage 14. The back wall 28 may further include a plurality of removable panels 94, 96, 98. The panels 94, 96, 98 are configured to be removed to allow the inner chamber to receive the printer.

Figure 6:
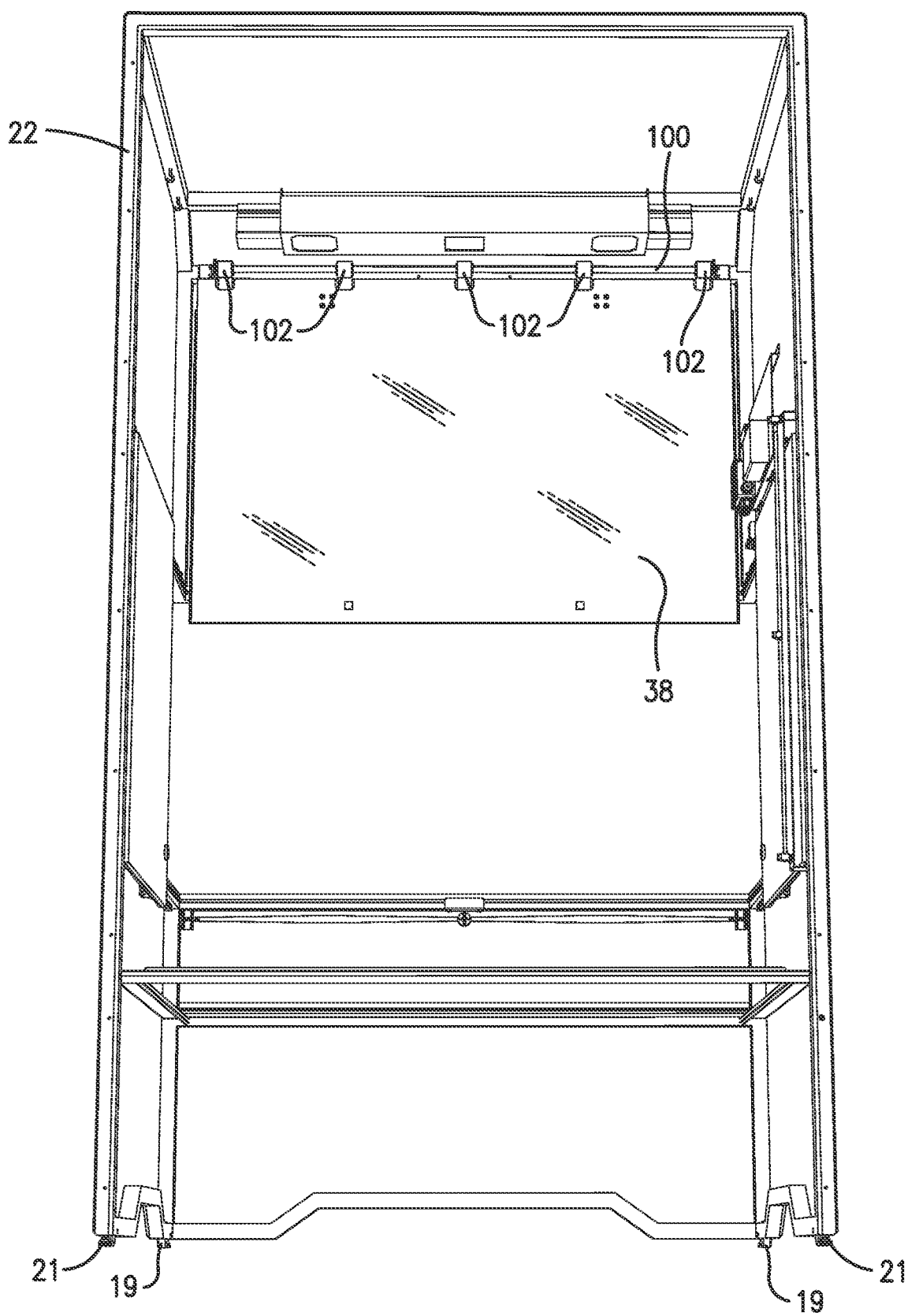
FIG. 6 is a rear view of the enclosure of FIG. 1 with its back wall removed to depict coil springs.

Turning to FIG. 6, a bar 100 may extend lengthwise across the wall 22, and a plurality of coil springs 102 may be evenly distributed on the bar 100 and attached to the front panel 38. The coils springs 102 provide vertical lift assist when shifting the front panel 38 between open and closed positions. The even distribution of the coil springs 102 helps maintain the front panel 38 in proper alignment as it shifts positions.

Figure 7A:
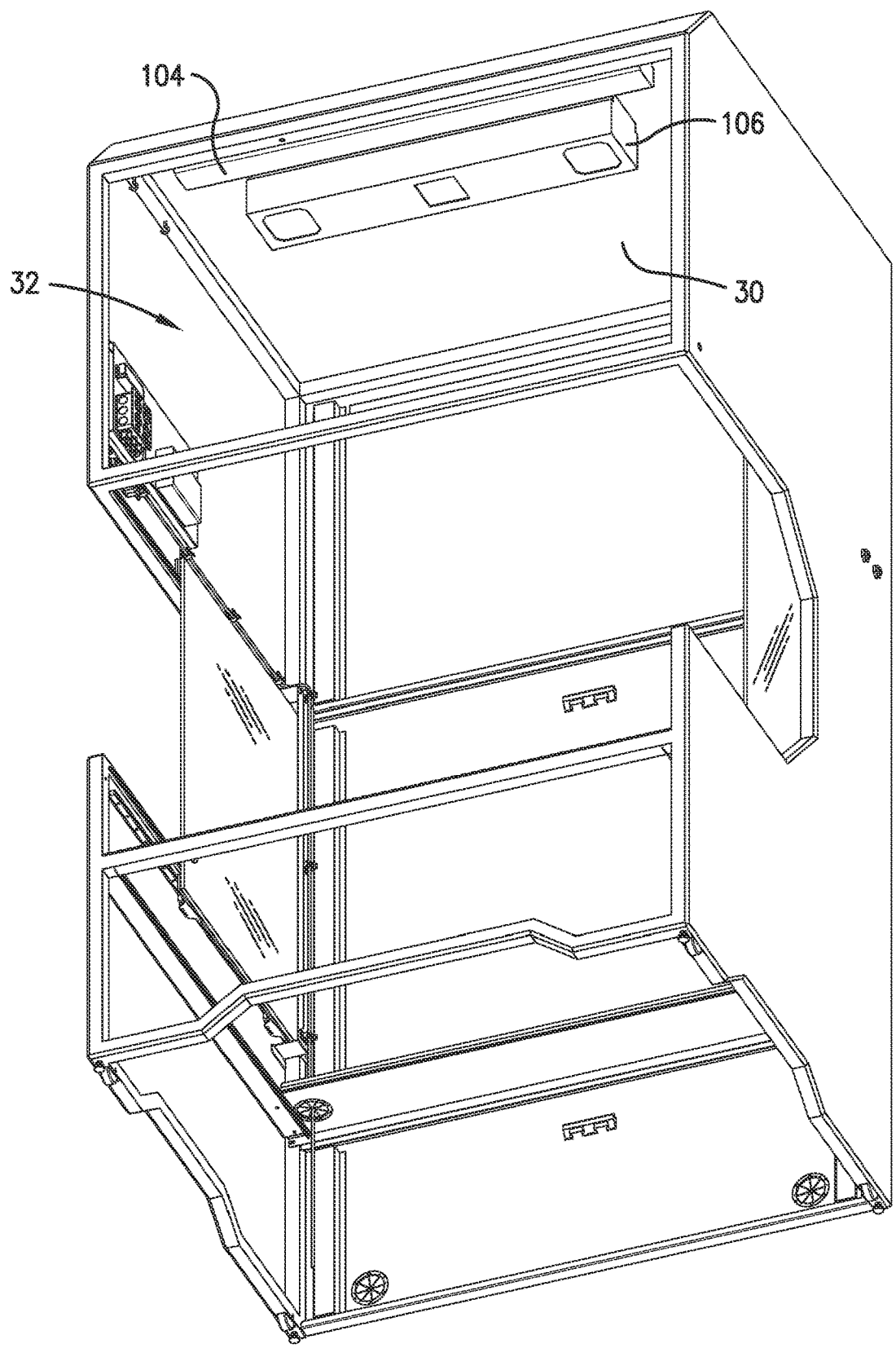
FIG. 7A is a lowered perspective view of the enclosure of FIG. 1 with its front walls removed to depict components on the inside of a top wall of the enclosure.

Turning to FIG. 7A, a light source 104 may be positioned on the top wall 30 for providing light in the inner chamber 32. The light source 104 may be turned on via switch 74 (depicted in FIG. 1). As discussed in further detail below, when the glass panels are activated, the light source 104 provides steady, reliable light for any cameras used by the printer 12 or for data collection. Additionally, an ionizer 106, or ionized air source, may be positioned on the top wall 30 for directing ionized air into the inner chamber 32 to prevent static charge buildup, which negatively affects print quality. The ionizer 106 may be activated via switch 72 (depicted in FIG. 1).

Figure 7B:
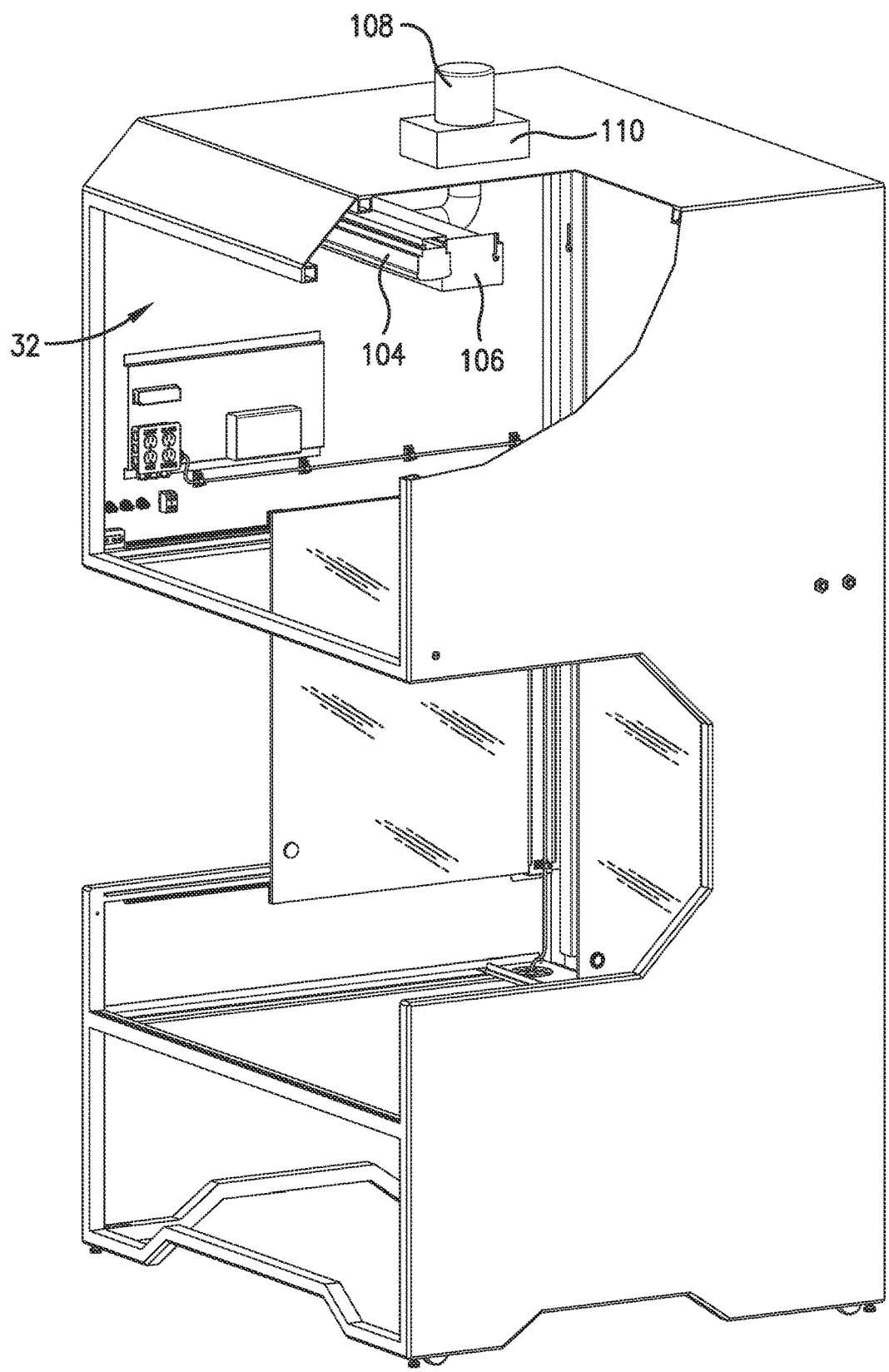
FIG. 7B is a perspective view of an enclosure according to another embodiment having a motor and filter to provide pressurized air.

Turning to FIG. 7B, in some embodiments, the ionizer 106 may comprise a pump 108 and a filter 110. The pump 108 may be configured to direct pressurized air through the filter 110, which is then directed to the ionizer 106 for providing pressurized, ionized air in the inner chamber 32.

Figure 8:
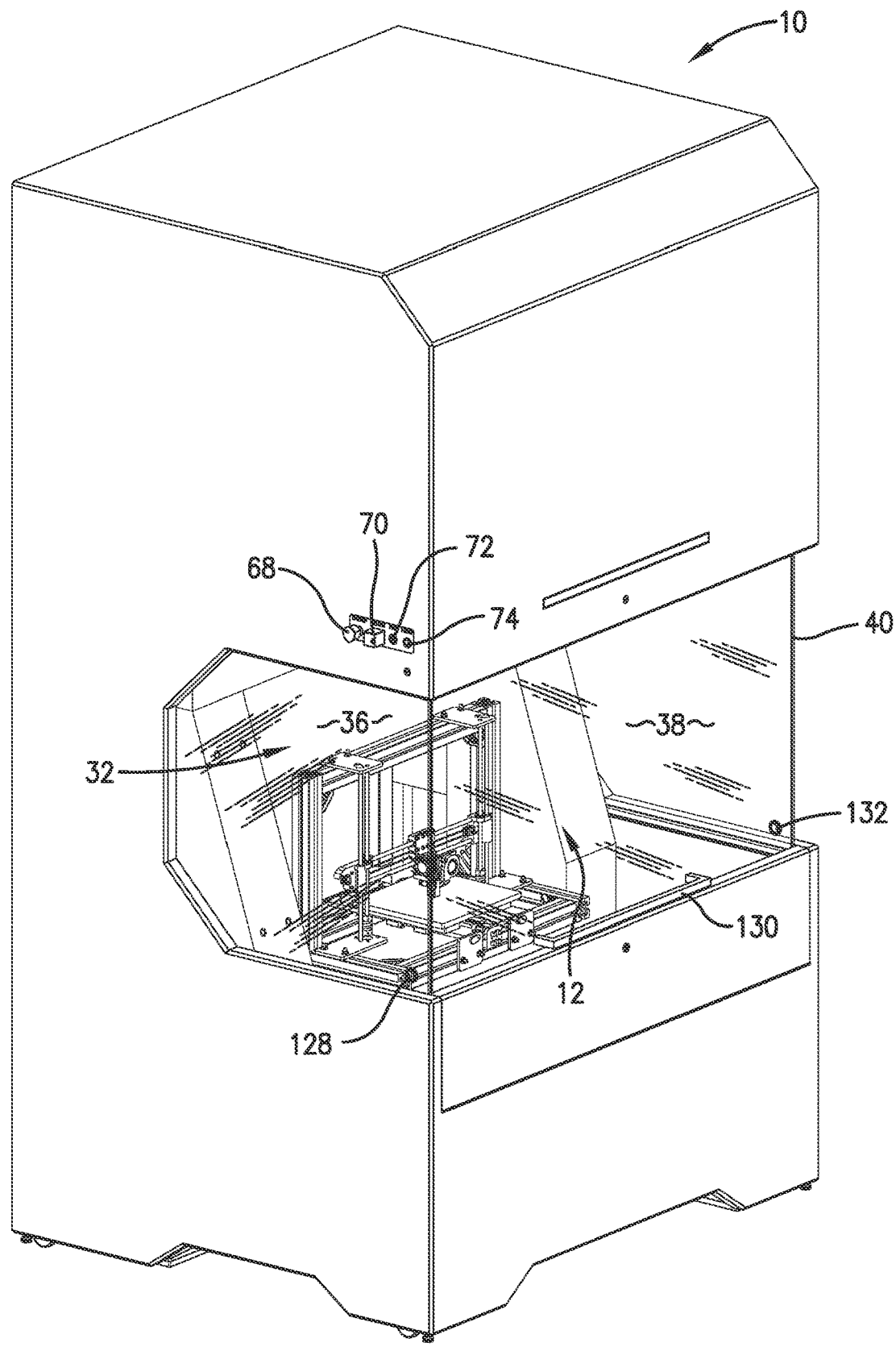
FIG. 8 is a perspective view of the enclosure of FIG. 1 with its glass panels in closed positions.

Turning to FIG. 8, glass panels 36, 38, 40 are configured to shift between open positions in which a user can access the printer 12 and closed positions in which the glass panels 36, 38, 40 block access to the inner chamber 32. FIG. 8 depicts the glass panels 36, 38, 40 being in their closed positions, and FIG. 1 depicts the glass panels 36, 38, 40 in their open positions. The glass panels 36, 38, 40 may include a plurality of seals attached to their ends that are configured to abut portions of adjacent glass panels and portions of the plurality of walls. The seals help maintain a positive pressure in the inner chamber 32 to keep dust off the build stage 14. In some embodiments, the seals on the glass panels 36, 38, 40 comprise feathered seals.

Figure 9:
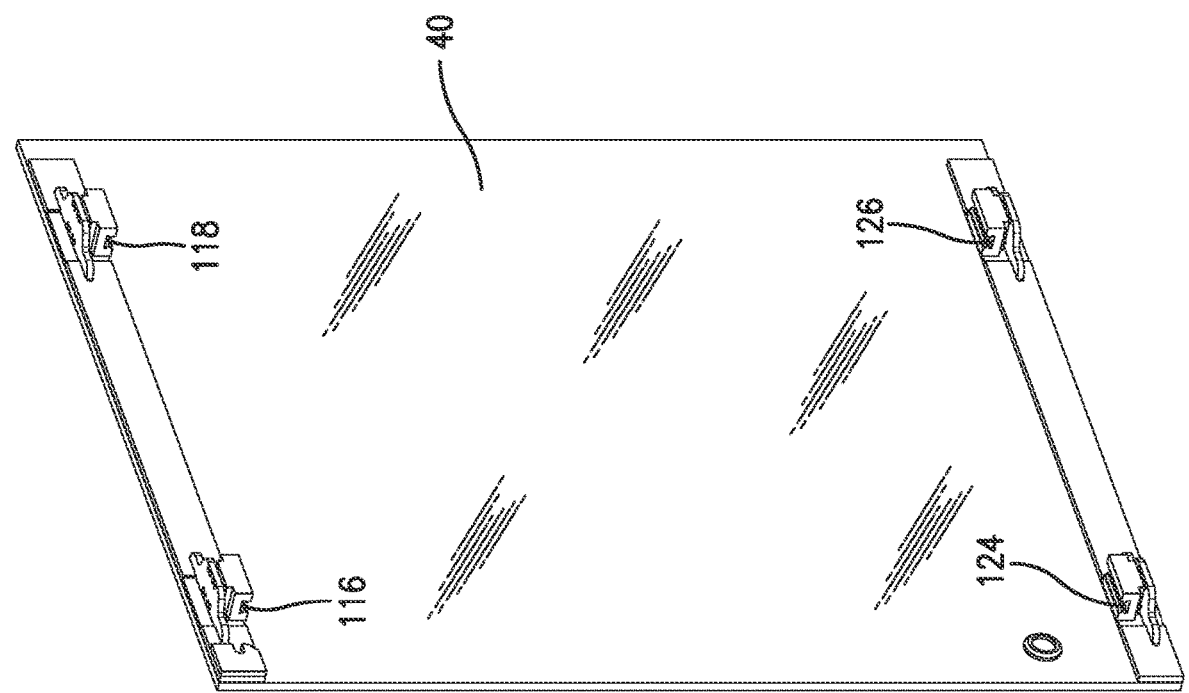
FIG. 9 is a perspective view of the side glass panels of the enclosure of FIG. 1.
Figure 9:
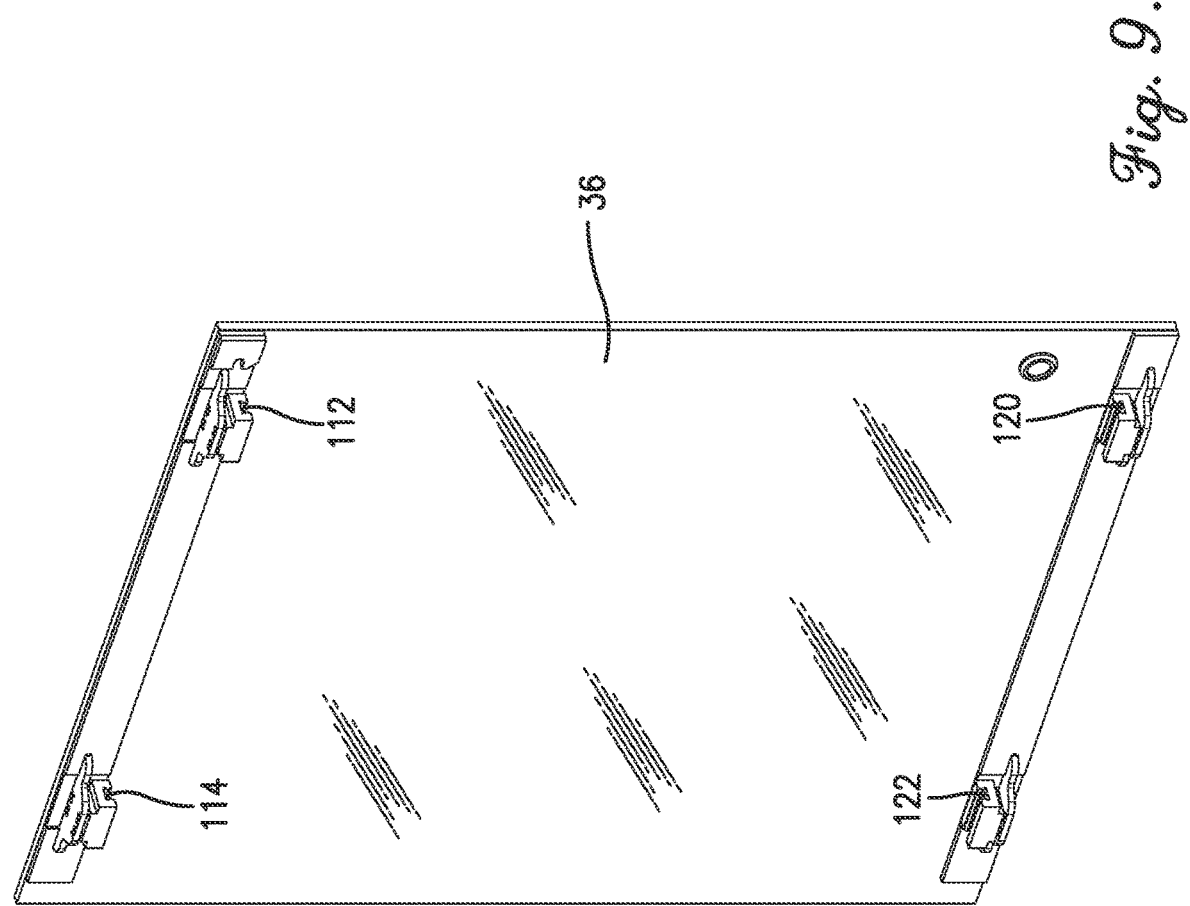

Turning briefly back to FIGS. 4 and 5, the side glass panels 36, 40 may be horizontally shiftable along the tracks 76, 78, 84, 86 of their respective walls 20, 26. As depicted in FIG. 9, the side glass panels 36, 40 may comprise upper rollers 112, 114, 116, 118 and lower rollers 120, 122, 124, 126 configured to engage and roll along their respective tracks 76, 78, 84, 86 (depicted in FIGS. 4 and 5).

Figure 10:
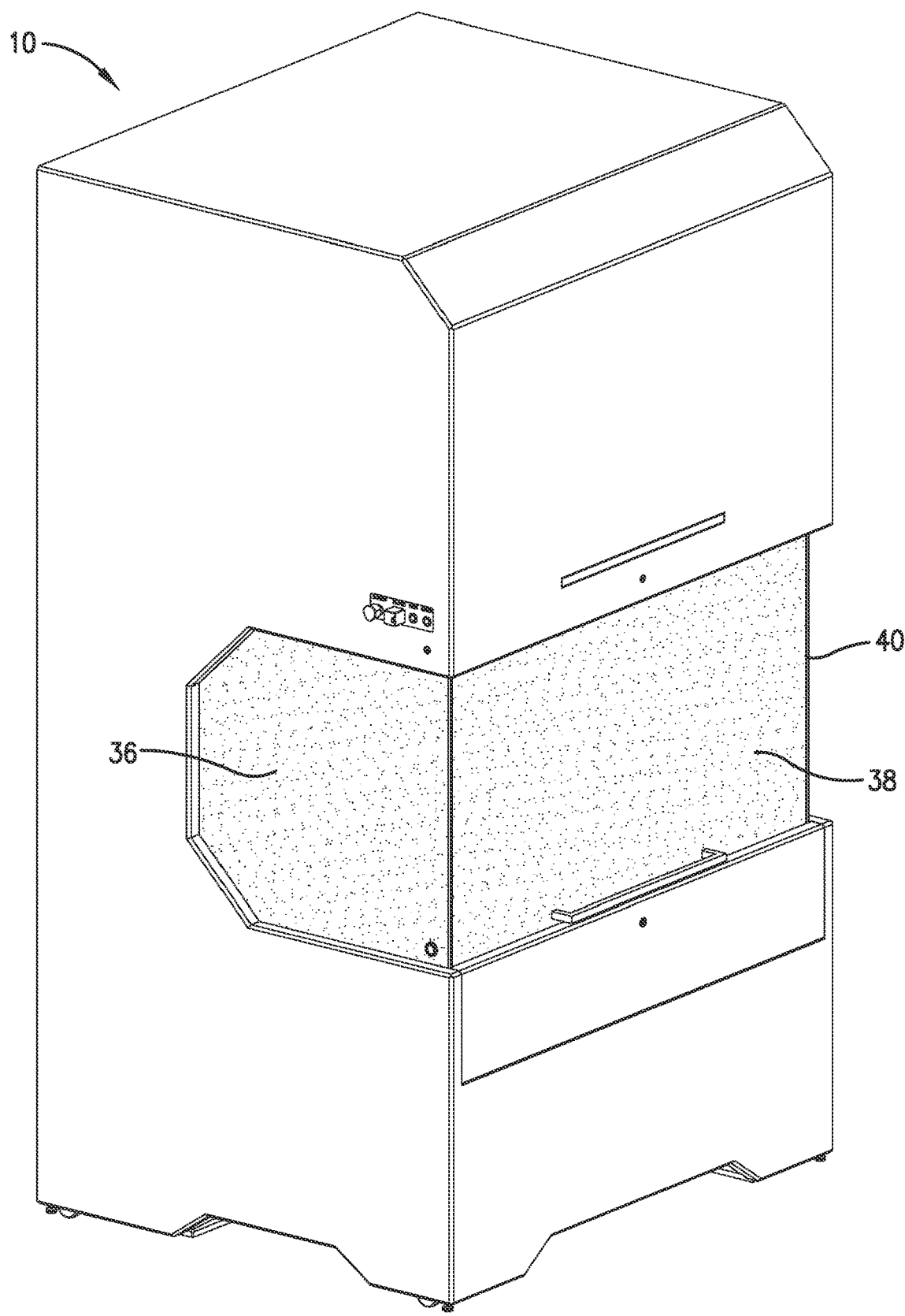
FIG. 10 is a perspective view of the enclosure of FIG. 1 with deactivated, opaque glass panels.

Turning back to FIG. 8, the glass panels 36, 38, 40 may comprise electrochromic glass operable to shift between transparent states and opaque states (depicted in FIG. 10). The glass panels 36, 38, 40 may be configured to switch states via switch 70. In some embodiments, the switch 70 may be connected to a power supply (not shown) that applies a voltage to the glass panels 36, 38, 40 when the switch 70 is in a state that activates the glass panels 36, 38, 40 so that they are transparent. The glass panels 36, 38, 40 may include handles 128, 130, 132 that a user may grip when shifting the glass panels 36, 38, 40 between the open and closed positions. By being able to switch to opaque states, the glass panels 36, 38, 40 prevent printed proprietary or otherwise confidential printed objects from being disclosed. Further, the opacity of the glass panels 36, 38, 40 filters out ambient light and/or other light disruptions/interferences that affect data gathered by the printer 12. For example, some printers 12 continuously capture image data of the performance of the printer 12 and/or of the object being printed. Ambient light and/or other light disruptions/interferences can negatively affect the image data. Thus, the light source 60 (depicted in FIG. 3) and the glass panels 36, 38, 40 in their opaque states collectively provide stable lighting for the collection of image data, thereby improving the quality of the image data and the performance of the printer 12.

Figure 11:
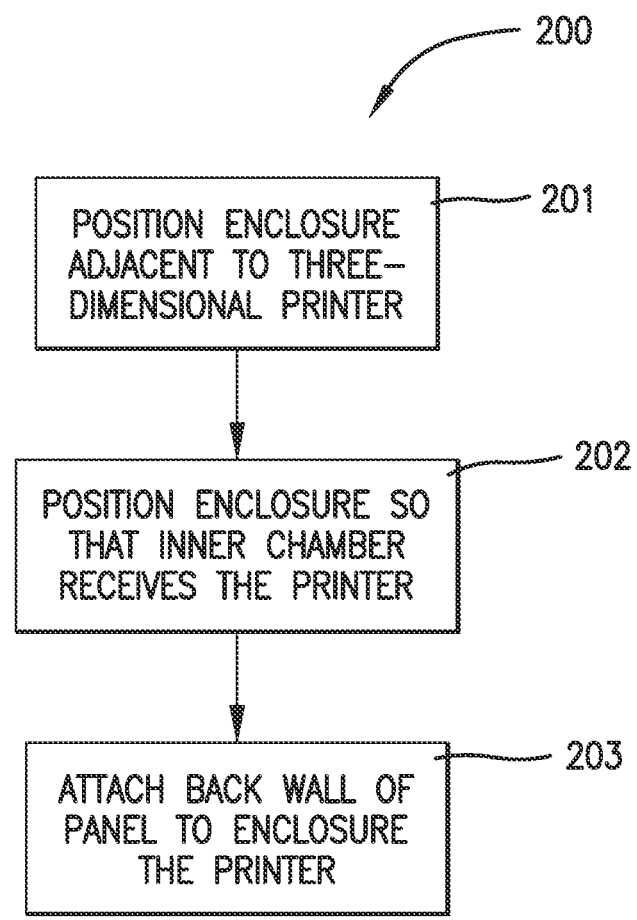
FIG. 11 is a flowchart illustrating a method of enclosing a three-dimensional printer according to an embodiment of the present invention.

The flow chart of FIG. 11 depicts the steps of an exemplary method 200 of installing an enclosure about a three-dimensional printer. In some alternative implementations, the functions noted in the various blocks may occur out of the order depicted in FIG. 11. For example, two blocks shown in succession in FIG. 11 may in fact be executed substantially concurrently, or the blocks may sometimes be executed in the reverse order depending upon the functionality involved. In addition, some steps may be optional. The method 200 is described below, for ease of reference, as being executed by exemplary devices and components introduced with the embodiments illustrated in FIGS. 1-10.

Referring to step 201, the enclosure may be positioned in front of the three-dimensional printer via a forklift or pallet jack. This step 201 may include inserting the forks of the forklift or pallet jack into the slots of the walls of the enclosure to lift and position the enclosure. The panels of the back wall of the enclosure may be removed, and the adjustable legs may be retracted so that the wheels of the enclosure engage the ground.

Referring to step 202, the enclosure may be positioned around the printer so that the inner chamber of the enclosure receives the printer. The enclosure may be positioned so that the seals on the walls of the enclosure abut the build stage of the printer. This step may include adjusting the adjustable legs to make the enclosure level.

Referring to step 203, the panels of the back wall of the enclosure may be attached to fully enclose the printer. This step may also include shifting the glass panels into their closed positioned and optionally locking them in the closed positions via their push locks. This step may further include connecting a pressurized air source to the pressurized air nozzle.

The method 200 may include additional, less, or alternate steps and/or device(s), including those discussed elsewhere herein. For example, the light source, ionizer, and/or glass panels may be activated.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An enclosure for a three-dimensional printing system, the enclosure comprising:
   a first side frame;
   a second side frame spaced apart from and opposing the first side frame;
   a front side frame connected to the first side frame and the second side frame;
   a plurality of walls defining an inner chamber, an access opening providing access to the inner chamber from outside the plurality of walls, and a back opening for receiving the three-dimensional printing system into the inner chamber;
   one or more back panel configured to removably attach to the first side frame and the second side frame to block the back opening; and
   an electrochromic glass panel that is shiftable between a closed position in which the electrochromic glass panel blocks the access opening to prevent access to the inner chamber and an open position in which the electrochromic glass panel allows access to the inner chamber via the access opening.

2. The enclosure of claim 1, wherein the electrochromic glass panel is a front electrochromic glass panel, further comprising side electrochromic glass panels that are horizontally shiftable relative to the front electrochromic glass panel.

3. The enclosure of claim 1, further comprising a locking mechanism configured to secure the electrochromic glass panel in the closed position.

4. The enclosure of claim 3, wherein the locking mechanism comprises a push lock attached to one of the plurality of walls and configured to engage the electrochromic glass panel.

5. The enclosure of claim 1, further comprising an ionized air source configured to introduce ionized air into the inner chamber.

6. The enclosure of claim 1, further comprising a light source positioned in the inner chamber.

7. The enclosure of claim 1, further comprising an indicator light positioned on one of the plurality of walls and configured to activate when the indicator light receives a signal representative of a status of the three-dimensional printing system.

8. The enclosure of claim 1, further comprising a plurality of wheels extending from the first and second side frames.

9. The enclosure of claim 1, further comprising a plurality of seals attached to the plurality of walls and configured to abut the three-dimensional printing system.

10. The enclosure of claim 1, wherein at least one of the first side frame, the second side frame, or the front side frame includes a recessed portion defining a pallet jack slot configured to receive pallet forks for helping position the enclosure.

11. A method of enclosing a three-dimensional printer having a build stage, the method comprising:
   positioning an enclosure adjacent to the three-dimensional printer, the enclosure comprising—
      a first side frame,
      a second side frame spaced apart from and opposing the first side frame,
      a front side frame connected to the first side frame and the second side frame,
      a plurality of walls defining an inner chamber, and an access opening providing access to the inner chamber from outside the plurality of walls, and a back opening for receiving the three-dimensional printer into the inner chamber, and
      an electrochromic glass panel that is shiftable between a closed position in which the electrochromic glass panel blocks the access opening to prevent access to the inner chamber and an open position in which the electrochromic glass panel allows access to the inner chamber via the access opening; and
   moving the enclosure so that the inner chamber receives the three-dimensional printer.

12. The method of claim 11, wherein the plurality of walls include pallet jack slots, a plurality of wheels, and a removable back wall, further comprising attaching the back wall to enclose the three-dimensional printer in the inner chamber of the enclosure.

13. The method of claim 11, wherein the plurality of walls include tubular seals, and the step of moving the enclosure comprises abutting the tubular seals against the build stage of the three-dimensional printer.

14. The method of claim 11, wherein the enclosure comprises a nozzle for receiving pressurized air for introducing into the inner chamber, further comprising attaching a pressurized air hose to the nozzle.

15. A three-dimensional printing system enclosure comprising:
   a first side frame;
   a second side frame spaced apart from and opposing the first side frame;
   a front side frame connected to the first side frame and the second side frame;
   a plurality of walls defining an inner chamber, an access opening providing access to the inner chamber from outside the plurality of walls, and a back opening for receiving a three-dimensional printing system into the inner chamber;
   one or more back panel configured to removably attach to the first side frame and the second side frame to block the back opening;
   a plurality of electrochromic glass panels that are shiftable between closed positions in which the electrochromic glass panels block the access opening to prevent access to the inner chamber and open positions in which the electrochromic glass panels allow access to the inner chamber via the access opening, the plurality of electrochromic glass panels comprising horizontally shiftable side panels, and a vertically shiftable front panel;
   one or more switching mechanism configured to activate the side panels and the front panel so that the side panels and the front panel are transparent; and
   a locking mechanism configured to secure at least one of the plurality of electrochromic glass panels in the closed position.

16. The enclosure of claim 15, further comprising an ionized air source attached to one of the plurality of walls and configured to introduce ionized air into the inner chamber.

17. The enclosure of claim 15, further comprising a light source positioned on one of the plurality of walls and configured to introduce light into the inner chamber.

18. The enclosure of claim 15, further comprising an indicator light configured to activate when the indicator light receives a signal representative of a status of the three-dimensional printing system.

19. The enclosure of claim 15, further comprising a plurality of wheels extending from the plurality of walls.

20. The enclosure of claim 15, wherein the locking mechanism comprises a push lock configured to engage one of the plurality of electrochromic glass panels.

* * * * *